(12) United States Patent
Suzuki

(10) Patent No.: US 6,633,307 B1
(45) Date of Patent: Oct. 14, 2003

(54) AUDIO SYSTEM APPARATUS

(75) Inventor: Kenji Suzuki, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 441 days.

(21) Appl. No.: 09/694,991

(22) Filed: Oct. 24, 2000

(30) Foreign Application Priority Data

Oct. 25, 1999 (JP) ............................................ 11-303002
Feb. 14, 2000 (JP) ...................................... 2000-035732

(51) Int. Cl.⁷ .............................................. G11B 17/22
(52) U.S. Cl. ........................................ 345/700; 369/58
(58) Field of Search ................................. 345/790, 797, 345/762, 772, 764, 700; 369/58, 48, 49, 59, 47, 32, 30.24

(56) References Cited

U.S. PATENT DOCUMENTS

| | | | | |
|---|---|---|---|---|
| 5,810,599 A | * | 9/1998 | Bishop | 434/157 |
| 6,021,320 A | * | 2/2000 | Bickford et al. | 455/186.1 |
| 6,388,960 B1 | * | 5/2002 | Furukawa et al. | 369/30.24 |

\* cited by examiner

*Primary Examiner*—Cao (Kevin) Nguyen
(74) *Attorney, Agent, or Firm*—Pillsbury Winthrop LLP

(57) ABSTRACT

An audio system apparatus, in which contents of operations of plural apparatuses are efficiently displayed, is provided. Sets of display information respectively corresponding to operation states of plural apparatuses in an audio system apparatus, and display priorities of the sets of display information are previously determined. In such a case that where a display switchover operation key is operated, the operation states of the plural apparatuses are detected, and display information on a display device is then switched over in accordance with the display priorities.

4 Claims, 17 Drawing Sheets

FIG. 6

| APPARATUS | STATE OF APPARATUS | DISPLAY FLAG | DISPLAY INFORMATION | DISPLAY PRIORITY |
|---|---|---|---|---|
| MD DECK 2 | RECORDING OPERATION STATE | ON/OFF | [1] "MD," TRACK NUMBER, RECORD TIME | 1 |
| | | ON/OFF | [2] "MD," TITLE (TITLE INPUT MODE) | 2 |
| | REPRODUCING OPERATION STATE | ON/OFF | [3] "MD," TRACK NUMBER, REPRODUCTION TIME | 4 |
| | | ON/OFF | [4] "MD," TITLE | 5 |
| | POWER-ON STATE | ON/OFF | [5] "MD," TITLE ("NO DISC" WHEN THERE IS NO DISC) | 6 |
| TAPE DECK 3 | RECORDING OPERATION STATE | ON/OFF | [6] "TAPE," RECORD TIME | 3 |
| | REPRODUCING OPERATION STATE | ON/OFF | [7] "TAPE," REPRODUCTION TIME | 7 |
| | POWER-ON STATE | ON/OFF | [8] "TAPE," DISPLAY OF PRESENCE OR ABSENCE OF TAPE | 8 |
| CD PLAYER 1 | REPRODUCING OPERATION STATE | ON/OFF | [9] "CD," TRACK NUMBER, REPRODUCTION TIME | 9 |
| | | ON/OFF | [10] "CD," TITLE | 10 |
| | POWER-ON STATE | ON/OFF | [11] "CD," TITLE ("NO DISC" WHEN THERE IS NO DISC) | 11 |
| TUNER 4 | POWER-ON STATE | ON/OFF | [12] "TUNER," PRESET FREQUENCY | 12 |
| TIMER 10 | POWER-ON STATE | ON/OFF | [13] "TIMER," PRESENT TIME | 13 |
| | | ON/OFF | [14] "TIMER," TIMER SET TIME (TIMER SETTING MODE) | 14 |

FIG. 9

| APPARATUS | STATE OF APPARATUS | DISPLAY FLAG | DISPLAY INFORMATION | DISPLAY PRIORITY |
|---|---|---|---|---|
| MD DECK 2 | RECORDING OPERATION STATE | OFF | [1] "MD," TRACK NUMBER, RECORD TIME | 1 |
| | | OFF | [2] "MD," TITLE (TITLE INPUT MODE) | 2 |
| | REPRODUCING OPERATION STATE | OFF | [3] "MD," TRACK NUMBER, REPRODUCTION TIME | 4 |
| | | OFF | [4] "MD," TITLE | 5 |
| | POWER-ON STATE | ON | [5] "MD," TITLE ("NO DISC" WHEN THERE IS NO DISC) | 6 |

⇒ CASE WHERE COMMAND SIGNAL OF CHANGING MD DECK 2 FROM "POWER-ON STATE" TO "RECORDING OPERATION STATE" IS SUPPLIED TO CONTROLLING SECTION 8

| APPARATUS | STATE OF APPARATUS | DISPLAY FLAG | DISPLAY INFORMATION | DISPLAY PRIORITY |
|---|---|---|---|---|
| MD DECK 2 | RECORDING OPERATION STATE | ON | [1] "MD," TRACK NUMBER, RECORD TIME | 1 |
| | | ON | [2] "MD," TITLE (TITLE INPUT MODE) | 2 |
| | REPRODUCING OPERATION STATE | OFF | [3] "MD," TRACK NUMBER, REPRODUCTION TIME | 4 |
| | | OFF | [4] "MD," TITLE | 5 |
| | POWER-ON STATE | OFF | [5] "MD," TITLE ("NO DISC" WHEN THERE IS NO DISC) | 6 |

FIG. 11

| APPARATUS | STATE OF APPARATUS | DISPLAY FLAG | DISPLAY INFORMATION | DISPLAY PRIORITY |
|---|---|---|---|---|
| MD DECK 2 | RECORDING OPERATION STATE | OFF | [1] "MD," TRACK NUMBER, RECORD TIME | 1 |
| | | OFF | [2] "MD," TITLE (TITLE INPUT MODE) | 2 |
| | REPRODUCING OPERATION STATE | OFF | [3] "MD," TRACK NUMBER, REPRODUCTION TIME | 4 |
| | | OFF | [4] "MD," TITLE | 5 |
| | POWER-ON STATE | ON | [5] "MD," TITLE ("NO DISC" WHEN THERE IS NO DISC) | 3 |
| TAPE DECK 3 | RECORDING OPERATION STATE | OFF | [6] "TAPE," RECORD TIME | 7 |
| | REPRODUCING OPERATION STATE | OFF | [7] "TAPE," REPRODUCTION TIME | 8 |
| | POWER-ON STATE | OFF | [8] "TAPE," DISPLAY OF PRESENCE OR ABSENCE OF TAPE | 9 |
| CD PLAYER 1 | REPRODUCING OPERATION STATE | OFF | [9] "CD," TRACK NUMBER, REPRODUCTION TIME | 10 |
| | | OFF | [10] "CD," TITLE | 11 |
| | POWER-ON STATE | OFF | [11] "CD," TITLE ("NO DISC" WHEN THERE IS NO DISC) | 12 |
| TUNER 4 | POWER-ON STATE | ON | [12] "TUNER," PRESET FREQUENCY | 13 |
| TIMER 10 | POWER-ON STATE | ON | [13] "TIMER," PRESENT TIME | 14 |
| | | ON | [14] "TIMER," TIMER SET TIME (TIMER SETTING MODE) | |

FIG. 12

| APPARATUS | STATE OF APPARATUS | DISPLAY FLAG | DISPLAY INFORMATION | DISPLAY PRIORITY |
|---|---|---|---|---|
| MD DECK 2 | RECORDING OPERATION STATE | ON | [1] "MD," TRACK NUMBER, RECORD TIME | 1 |
|  |  | ON | [2] "MD," TITLE (TITLE INPUT MODE) | 2 |
|  | REPRODUCING OPERATION STATE | OFF | [3] "MD," TRACK NUMBER, REPRODUCTION TIME | 4 |
|  |  | OFF | [4] "MD," TITLE | 5 |
|  | POWER-ON STATE | OFF | [5] "MD," TITLE ("NO DISC" WHEN THERE IS NO DISC) | 6 |
| TAPE DECK 3 | RECORDING OPERATION STATE | OFF | [6] "TAPE," RECORD TIME | 3 |
|  | REPRODUCING OPERATION STATE | OFF | [7] "TAPE," REPRODUCTION TIME | 7 |
|  | POWER-ON STATE | OFF | [8] "TAPE," DISPLAY OF PRESENCE OR ABSENCE OF TAPE | 8 |
| CD PLAYER 1 | REPRODUCING OPERATION STATE | ON | [9] "CD," TRACK NUMBER, REPRODUCTION TIME | 9 |
|  |  | ON | [10] "CD," TITLE | 10 |
|  | POWER-ON STATE | OFF | [11] "CD," TITLE ("NO DISC" WHEN THERE IS NO DISC) | 11 |
| TUNER 4 | POWER-ON STATE | OFF | [12] "TUNER," PRESET FREQUENCY | 12 |
| TIMER 10 | POWER-ON STATE | OFF | [13] "TIMER," PRESENT TIME | 13 |
|  |  | OFF | [14] "TIMER," TIMER SET TIME (TIMER SETTING MODE) | 14 |

FIG. 14

| APPARATUS | STATE OF APPARATUS | DISPLAY FLAG | DISPLAY INFORMATION | DISPLAY PRIORITY |
|---|---|---|---|---|
| MD DECK 2 | RECORDING OPERATION STATE | ON/OFF | [1] "MD," TRACK NUMBER, RECORD TIME | 1 |
| | | ON/OFF | [2] "MD," TITLE (TITLE INPUT MODE) | 2 |
| | REPRODUCING OPERATION STATE | ON/OFF | [3] "MD," TRACK NUMBER, REPRODUCTION TIME | 4 |
| | | ON/OFF | [4] "MD," TITLE | 5 |
| | POWER-ON STATE | ON/OFF | [5] "MD," TITLE ("NO DISC" WHEN THERE IS NO DISC) | 6 |
| TAPE DECK 3 | RECORDING OPERATION STATE | ON/OFF | [6] "TAPE," RECORD TIME | 3 |
| | REPRODUCING OPERATION STATE | ON/OFF | [7] "TAPE," REPRODUCTION TIME | 7 |
| | POWER-ON STATE | ON/OFF | [8] "TAPE," DISPLAY OF PRESENCE OR ABSENCE OF TAPE | 8 |
| CD PLAYER 1 | REPRODUCING OPERATION STATE | ON/OFF | [9] "CD," TRACK NUMBER, REPRODUCTION TIME | 9 |
| | | ON/OFF | [10] "CD," TITLE | 10 |
| | POWER-ON STATE | ON/OFF | [11] "CD," TITLE ("NO DISC" WHEN THERE IS NO DISC) | 11 |
| TUNER 4 | REPRODUCING OPERATION STATE OR POWER-ON STATE | ON/OFF | [12] "TUNER," PRESET FREQUENCY | 12 |
| TIMER 10 | POWER-ON STATE | ON/OFF | [13] "TIMER," PRESENT TIME | 13 |
| | | ON/OFF | [14] "TIMER," TIMER SET TIME (TIMER SETTING MODE) | 14 |

FIG. 15

| APPARATUS | STATE OF APPARATUS | DISPLAY FLAG | DISPLAY INFORMATION | DISPLAY PRIORITY |
|---|---|---|---|---|
| MD DECK 2 | RECORDING OPERATION STATE | ON | [1] "MD," TRACK NUMBER, RECORD TIME | 1 |
| | | ON | [2] "MD," TITLE (TITLE INPUT MODE) | 2 |
| | REPRODUCING OPERATION STATE | OFF | [3] "MD," TRACK NUMBER, REPRODUCTION TIME | 4 |
| | | OFF | [4] "MD," TITLE | 5 |
| | POWER-ON STATE | OFF | [5] "MD," TITLE ("NO DISC" WHEN THERE IS NO DISC) | 6 |
| TAPE DECK 3 | RECORDING OPERATION STATE | OFF | [6] "TAPE," RECORD TIME | 3 |
| | REPRODUCING OPERATION STATE | OFF | [7] "TAPE," REPRODUCTION TIME | 7 |
| | POWER-ON STATE | OFF | [8] "TAPE," DISPLAY OF PRESENCE OR ABSENCE OF TAPE | 8 |
| CD PLAYER 1 | REPRODUCING OPERATION STATE | ON | [9] "CD," TRACK NUMBER, REPRODUCTION TIME | 9 |
| | | ON | [10] "CD," TITLE | 10 |
| | POWER-ON STATE | OFF | [11] "CD," TITLE ("NO DISC" WHEN THERE IS NO DISC) | 11 |
| TUNER 4 | REPRODUCING OPERATION STATE OR POWER-ON STATE | ON | [12] "TUNER," PRESET FREQUENCY | 12 |
| TIMER 10 | POWER-ON STATE | OFF | [13] "TIMER," PRESENT TIME | 13 |
| | | OFF | [14] "TIMER," TIMER SET TIME (TIMER SETTING MODE) | 14 |

AUDIO SYSTEM APPARATUS

BACKGROUND OF THE INVENTION

1. Field of the Invention

The present invention relates to an audio system apparatus having a plurality of audio apparatuses.

The present application is based on Japanese Patent Application Nos. Hei. 11-303002 and 2000-35732, which are incorporated herein by reference.

2. Description of the Related Art

Recently, various audio apparatuses such as a CD (Compact Disc) player and an MD (Mini Disc) deck become widespread, and an audio system apparatus in which a plurality of audio apparatuses are combined with one another is popularly used.

FIG. 1 is a simplified block diagram of a usual audio system apparatus 100. The audio system apparatus 100 includes three audio apparatuses, such as a CD player 101, an MD deck 102, and a cassette tape deck 103; a display device 104; and a controlling section 105. The operations of the three audio apparatuses are controlled by the controlling section 105, and contents of operations of the audio apparatuses are displayed on the display device 104.

The controlling section 105 is provided with an operation key corresponding to various operations of the audio apparatuses. The user of the audio system apparatus 100 can operate the operation key to arbitrarily control the operations of the audio apparatuses.

For example, a CD reproduced signal from the CD player 101 can be recorded onto an MD in the MD deck 102.

FIG. 2 shows an appearance of the display device 104 in the audio system apparatus. As shown in the figure, the reproducing operation state of the CD player 101, and the recording operation state of the MD deck 102 are simultaneously displayed, so that the user can check the reproducing operation of the CD player 101, and the recording operation of the MD deck 102.

Although an audio system apparatus serves generally as a multifunctional apparatus, such an apparatus is requested to be miniaturized. Therefore, also the display device 104 is required to be miniaturized.

FIG. 3 shows an example in which the sizes of the display characters of the display device 104 are changed so as to miniaturize the display device. In this example, the display resolution is low, and hence it is difficult for the user to check the display information.

FIG. 4 shows an example in which the contents to be displayed on the display device 104 are reduced so as to miniaturize the display device. In this case, when the kinds of the contents to be displayed on the display device are small in number (about, two or three kinds), a display switchover operation key may be additionally disposed so that display information is switched over by operating the operation key, thereby enabling the user to conveniently use the apparatus.

In accordance with advancement of diversification and multifunction of audio apparatuses, the kinds of the contents to be displayed on the display device tend to be increased in number (about 5 to 10 kinds). For example, even display information relating only to the MD deck 102 includes a large number of contents to be displayed, such as a display of the record time period of an MD, an unrecord time period of the MD, and a display of the title of the MD (title input display).

In such a case, even when the display switch over operation key is disposed and the display contents of the display device are switched over, it is often that the display switch over operation key must be operated many times until display information which is requested by the user is displayed. Therefore, the example is inconvenient for the user to use.

As a device for solving this problem, it may be contemplated to dispose operation keys respectively corresponding to sets of display information. When this countermeasure is employed, a space for disposing the operation keys is additionally required. This is contrary to the request for miniaturization of a display device, and produces a further problem in that the disposition of a large number of operation keys causes an apparatus to be inconveniently used.

SUMMARY OF THE INVENTION

In view of the above-discussed problems, it is an object of the present invention to provide an audio system apparatus which has a plurality of audio apparatuses, and in which contents of operations of the audio apparatuses can be efficiently displayed without increasing the size of a display device or disposing a large number of display switch over operation keys, thereby enabling the user to conveniently use the audio system apparatus.

To achieve the above object, according to the first aspect of the present invention, there is provided an audio system apparatus which includes: at least one audio apparatus which is able to be put in plural operation states; a display device on which at least one of a plurality of display information is displayed, wherein the plurality of display information respectively correspond to the plural operation states of the at least one audio apparatus; a display switch over operation key which is operative to switch over a display content of the display device; a display-priority information-storing device which stores display priority information indicating a priority order in which the plurality of display information are sequentially displayed on the display device; an operation detecting device which detects the plural operation states of the at least one audio apparatus; and a display control device which, in a case where there are a plurality of display information corresponding to at least one operation state detected by the operation detecting device, causes the display device to display display information of the next priority order per each time that the display switchover operation key is operated, in accordance with the display priority information stored in the display-priority information-storing device, wherein, in the display priority information, display information for the at least one audio apparatus in a recording operation state is set to be higher in priority than the other display information.

According to the second aspect of the present invention, the plural operation states of the at least one audio apparatus may include the recording operation state, a reproducing operation state, and a state which is neither the recording operation state nor the reproducing operation state.

According to the third aspect of the present invention, when the display switchover operation key is operated, the display control device may judge a current operation state of the at least one audio apparatus, and then determine the display content to be displayed on the display device.

According to the fourth aspect of the present invention, preferably, the priority order of the display priority information is previously determined.

BRIEF DESCRIPTION OF THE DRAWINGS

FIG. 6 is a view showing an example of an information table of the audio system apparatus of the embodiment of the present invention;

FIG. 7 is a flowchart of the display device in the case where a power source switch of the audio system apparatus of the embodiment of the present invention is turned on;

FIG. 9 is a view showing another example of the information table of the audio system apparatus of the embodiment of the present invention;

FIG. 11 is a view showing a further example of the information table of the audio system apparatus of the embodiment of the present invention;

FIG. 12 is a view showing a still further example of the information table of the audio system apparatus of the embodiment of the present invention;

FIG. 14 is a view showing an example of an information table of a modification of the embodiment of the present invention;

FIG. 15 is a view showing another example of an information table of the modification of the embodiment of the present invention;

DETAILED DESCRIPTION OF THE PREFERRED EMBODIMENTS

A. Embodiment of the Invention
A1. Construction of Embodiment

Hereinafter, an embodiment will be described with taking a case where an audio system apparatus of the CD/MD/Tape (Compact Disc/Mini Disc/Cassette Tape) combination type is used as the audio system apparatus of the present invention, as an example.

Figure 5:
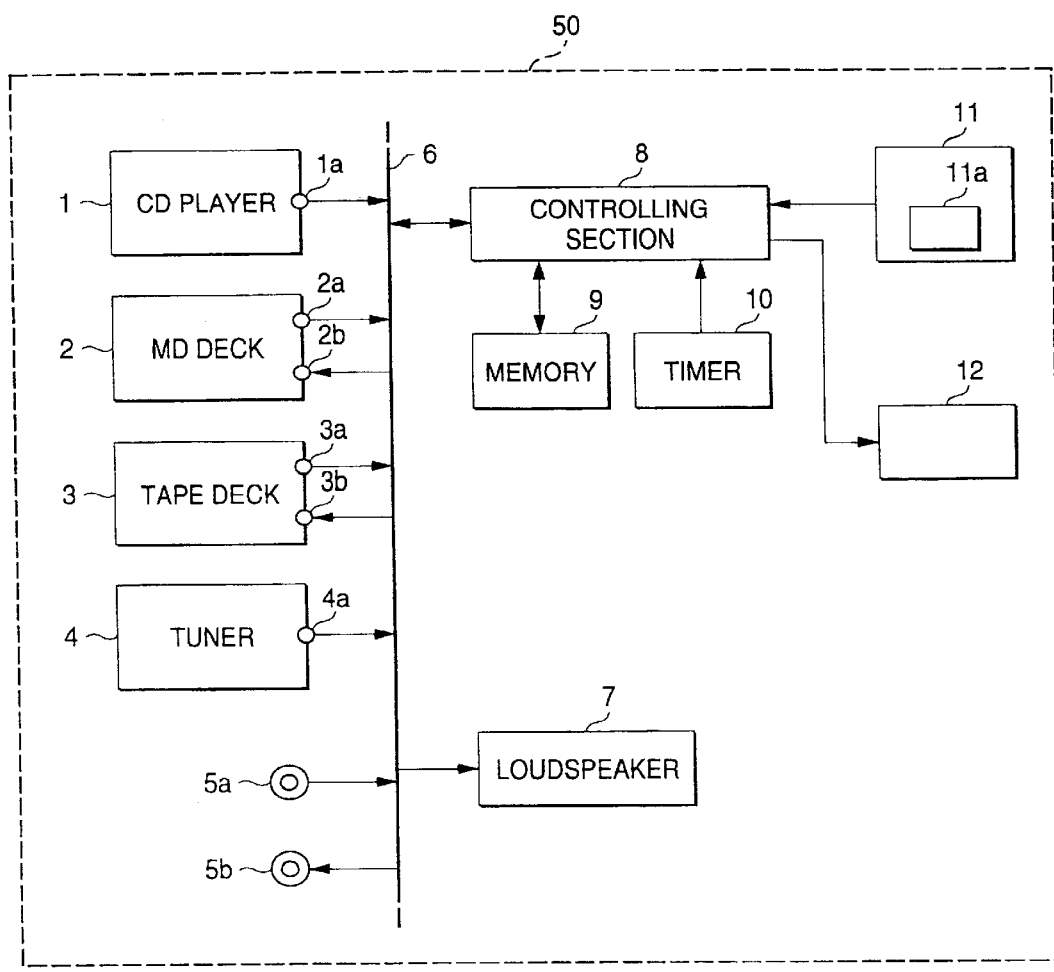
FIG. 5 is a block diagram of an audio system apparatus of an embodiment of the present invention.

FIG. 5 is a block diagram of an audio system apparatus 50 of the embodiment.

As shown in FIG. 5, the audio system apparatus 50 includes a CD player 1, an MD deck 2, a Tape deck 3, a tuner 4, an external input terminal 5a, an external output terminal 5b, a bus line 6, a loudspeaker 7, a controlling section 8, a memory 9, a timer 10, an operating section 11, and a display section 12.

The CD player 1 performs a reproducing operation on a CD which is loaded into the CD player 1. A signal reproduced from the CD is output through an output terminal 1a during the CD reproducing operation.

The MD deck 2 performs reproducing and recording operations on an MD loaded into the MD deck 2. A signal reproduced from the MD is output through an output terminal 2a during the MD reproducing operation, and a record signal which is to be recorded onto the MD loaded into the MD deck 2 is input through an input terminal 2b.

The Tape deck 3 performs reproducing and recording operations on a Tape (cassette tape) loaded into the Tape deck 3. A signal reproduced from the Tape is output through an output terminal 3a during the Tape reproducing operation, and a record signal which is to be recorded onto the Tape loaded into the Tape deck 3 is input through an input terminal 3b.

The tuner 4 receives a radio signal corresponding to a preset frequency. The received radio signal is output through an output terminal 4a.

An external signal is input into the audio system apparatus 50 through the external input terminal 5a. A signal generated in the audio system apparatus 50 is output through the external output terminal 5b.

The loudspeaker 7 acoustically outputs a signal from any one of the apparatuses in the audio system apparatus 50.

The CD player 1, the MD deck 2, the Tape deck 3, the tuner 4, the external input terminal 5a, the external output terminal 5b, and the loudspeaker 7 are connected to the bus line 6.

The timer 10 outputs time information, and, at a preset time, outputs a timer signal.

Figure 1:
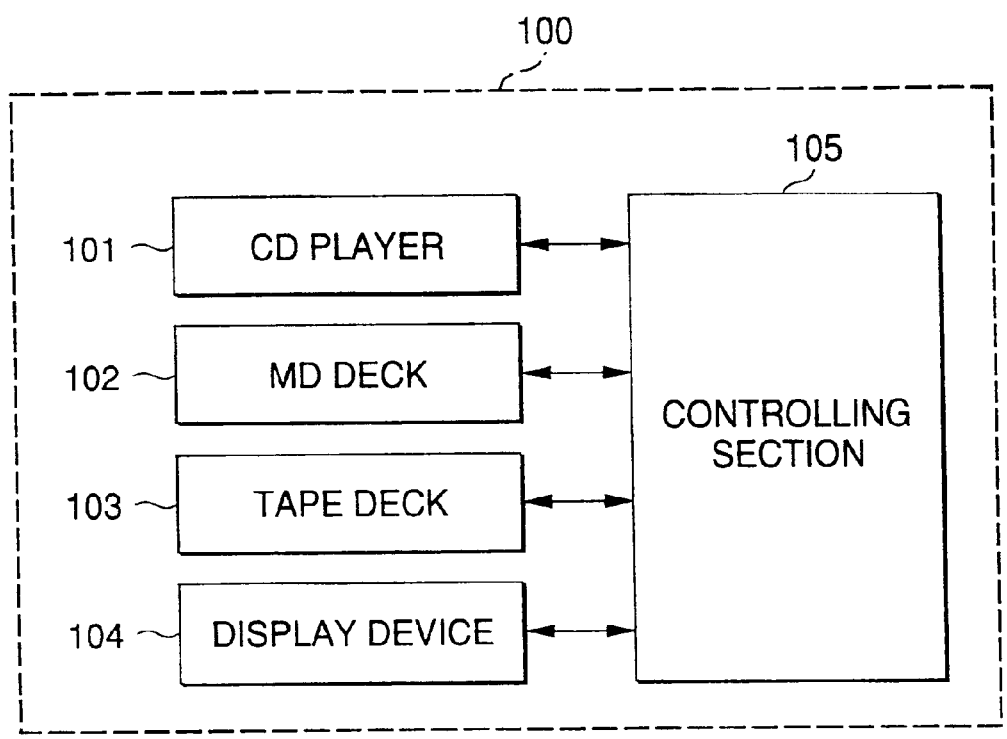
FIG. 1 is a simplified block diagram of a related audio system apparatus.
Figure 2:
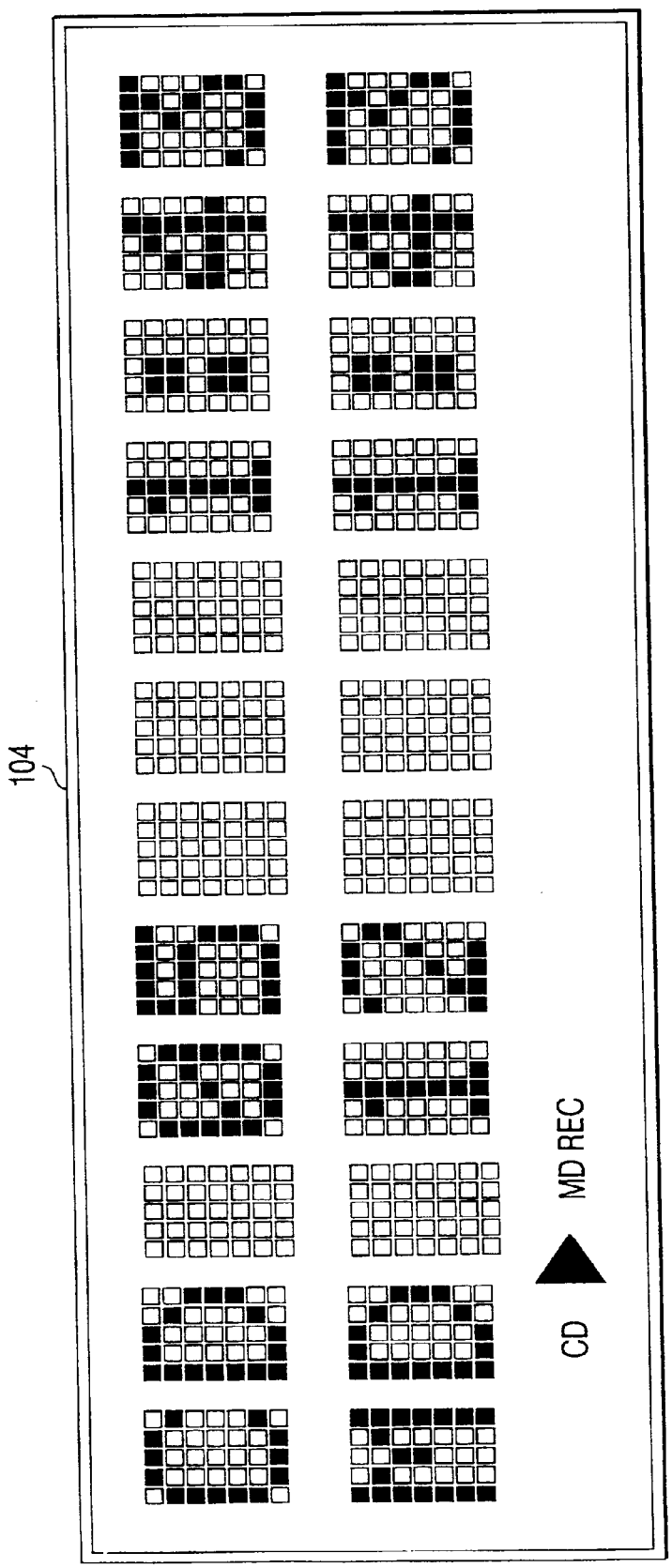
FIG. 2 shows a display device of the related audio system apparatus.
Figure 3:
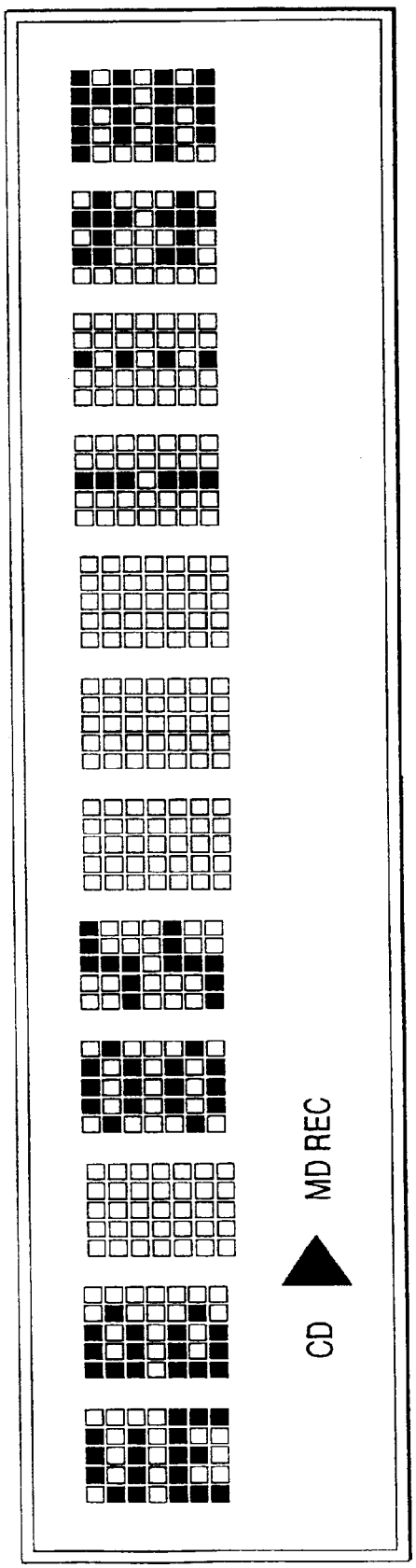
FIG. 3 shows an example in which the display device of the related audio system apparatus is miniaturized.
Figure 4:
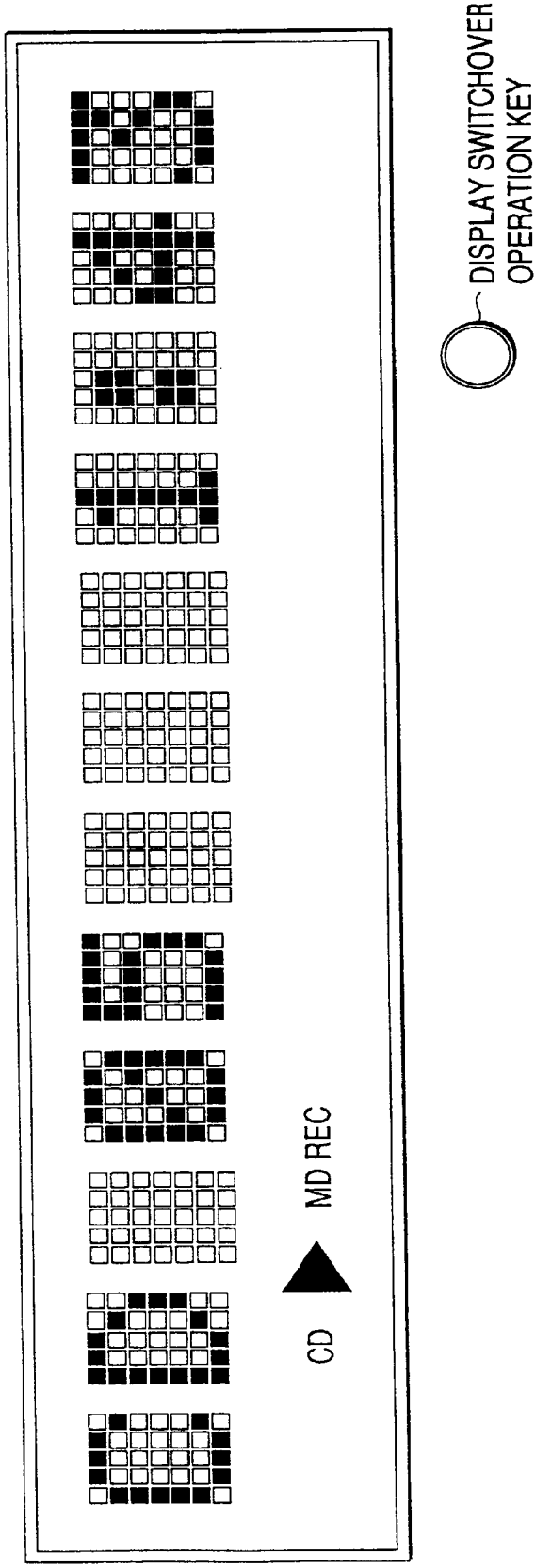
FIG. 4 shows another example in which the display device of the related audio system apparatus is miniaturized.

The display section 12 displays contents of operations of the components included in the audio system apparatus 50. The display section 12 is identical with the display device 104 shown in FIG. 4.

Various operation keys which are to be operated by the user of the audio system apparatus 50 are disposed in the operating section 11. As one of the operation keys, a display switch over operation key 11a for switching over display information of the display section 12 is disposed.

The controlling section 8 controls all operations of the components of the audio system apparatus 50. Programs for performing the various controls are stored in the memory 9.

Hereinafter, an information table stored in the memory 9 will be described. The information table is a list of display information which is to be displayed on the display section 12.

FIG. 6 specifically shows the contents of the information table in the embodiment. Specifically, the information table has columns of the kind of an apparatus, the state of the apparatus, display information, display priority, and a display flag.

In the column of the kind of an apparatus, among the apparatuses included in the audio system apparatus 50, apparatuses having display information which is to be displayed on the display section 12 are listed. In the audio system apparatus of this embodiment, such apparatuses are the CD player 1, the MD deck 2, the Tape deck 3, the tuner 4, and the timer 10.

The states of the apparatuses are three states, or "recording operation state," "reproducing operation state," and "state other than recording and reproducing operations." The above-mentioned apparatuses are in any one of the three states.

"Recording operation state" means a state in which the apparatus is actually performing a recording operation. In the embodiment, apparatuses which can be in the "recording operation state" are the MD deck 2 and the Tape deck 3.

"Reproducing operation state" means a state in which the apparatus is actually performing a reproducing operation. In the embodiment, apparatuses which can be in "reproducing operation state" are the CD player 1, the MD deck 2, and the Tape deck 3.

"State other than recording and reproducing operations" means a state in which the apparatus is not in any one of "recording operation state" and "reproducing operation state." In the embodiment, the state is called "power-on state." Apparatuses which can be in "power-on state" are the CD player 1, the MD deck 2, the Tape deck 3, the tuner 4, and the timer 10.

In the embodiment, when the main power source switch (not shown) of the audio system apparatus 50 is operated to be in the on state, the power is supplied to all of the apparatuses in the audio system apparatus 50. When the main power source switch (not shown) of the audio system apparatus 50 is operated to be in the off state, the power supply to all of the apparatuses in the audio system apparatus 50 is stopped. In the information table (FIG. 6) in the embodiment, therefore, there is no display information for an apparatus which is in "power-off state."

Display information (sets of display information are indicated as display information [1] to [14], respectively) shows specific contents of a display which is caused by the controlling section 8 to be displayed on the display section 12.

In display information [9], "track number" and "reproduction time period" are obtained by converting a CD reproduced signal which is supplied from the CD player 1 to the controlling section 8, into display data for the display section 12 by the controlling section 8. Therefore, the contents of "track number" and "reproduction time period" are changed in accordance with the reproducing operation of the CD player 1.

In display information [2], "title" means information configured by characters and/or symbols. When this information is displayed, the user can record a desired title on the MD.

The display priority indicates the display priority of display information to be displayed on the display section 12. The priorities of all sets of display information are previously determined as shown in FIG. 6.

In the embodiment, priorities 1 to 14 are set. The highest priority is allocated to 1, and the priority is gradually lowered as moving toward 14.

Higher priorities include display information [1] and [2] relating to "recording operation state" of the MD deck 2, and display information [3] and [4] relating to "recording operation state" of the Tape deck 3. All of these sets of display information relate to "recording operation state."

The display flag has either of the on state and the off state. The states are switched over by the controlling section 8. As shown in FIG. 6, the display flag is provided for each of the above-mentioned sets of display information. Only sets of display information in which the display flag is in the on state are sequentially displayed on the display section 12. The control of the display will be specifically described later.

A2. Operation of the Embodiment

Next, the operation of switching over the display of the display section 12 in the embodiment will be described.

In order to clarify the contents of the present invention, the display switch over operation which is performed on the display section 12 by the controlling section 8 in each of the cases where the main power switch is set to the on state, and where the operation key is operated will be described.

Figure 7:
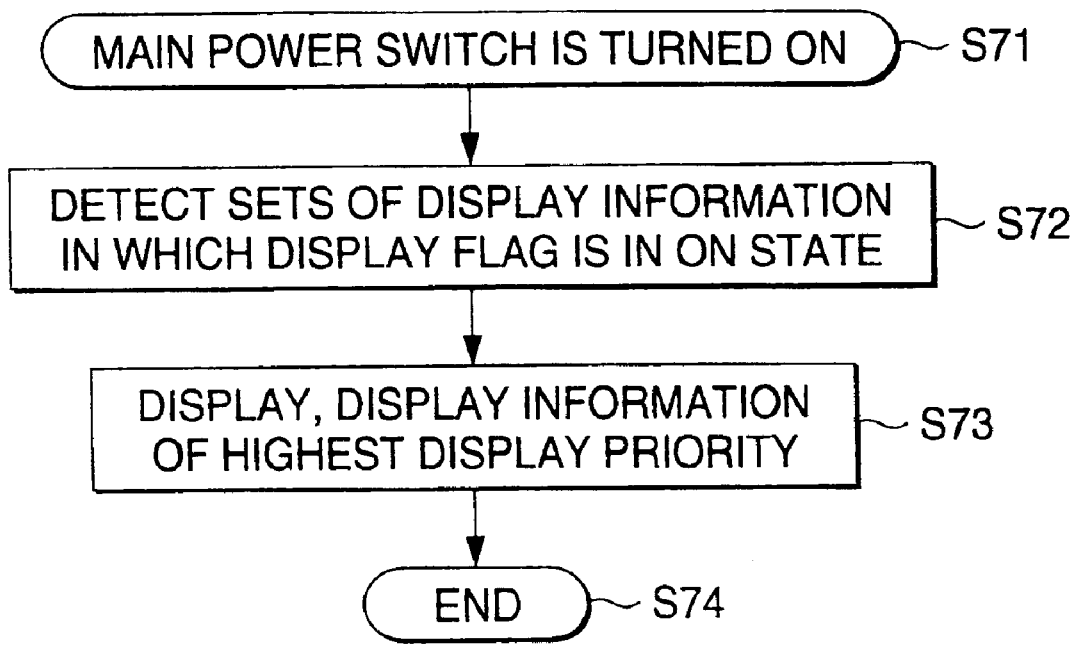

A2-1. Display Switch over in the Case Where the Main Power Switch is Set to the on State As described above, in the audio system apparatus 50 of the embodiment, when the main power switch (not shown) is set to the on state, the power is supplied to all of the apparatuses in the audio system apparatus 50. At this time, the power is supplied also to the controlling section 8, and the controlling section 8 implements a control program the flow of which is shown in FIG. 7 (step S71).

First, the controlling section 8 checks the information table (FIG. 6) stored in the memory 9, to detect sets of display information in which the display flag is in the on state (step S72).

The controlling section 8 causes the display information which has the highest display priority among the detected sets of display information, to be displayed (step S73), and then ends this flow (step S74).

When the main power switch is set to the off state, the controlling section 8 sets the display flag of "power-on state" of the apparatus corresponding to the display information which is displayed on the display section 12 at this timing, to the on state.

In other words, when the main power switch (not shown) is set to the on state, the controlling section 8 causes the display information of the apparatus corresponding to the display information which has been displayed on the display section 12 immediately before the previous turning off of the main power switch (not shown), to be displayed.

A2-2. Display Switchover in the Case Where an Operation Key Other than the Display Switchover Operation Key is Operated In the audio system apparatus 50, the plural operation keys for enabling the user to instruct the reproducing operation, the recording operation, and the like to the apparatuses are disposed in the operating section 11.

When the operation key corresponding to the recording operation of the MD deck 2 is operated by the user, for example, a predetermined command signal corresponding to the operation is supplied to the controlling section 8.

Figure 8:
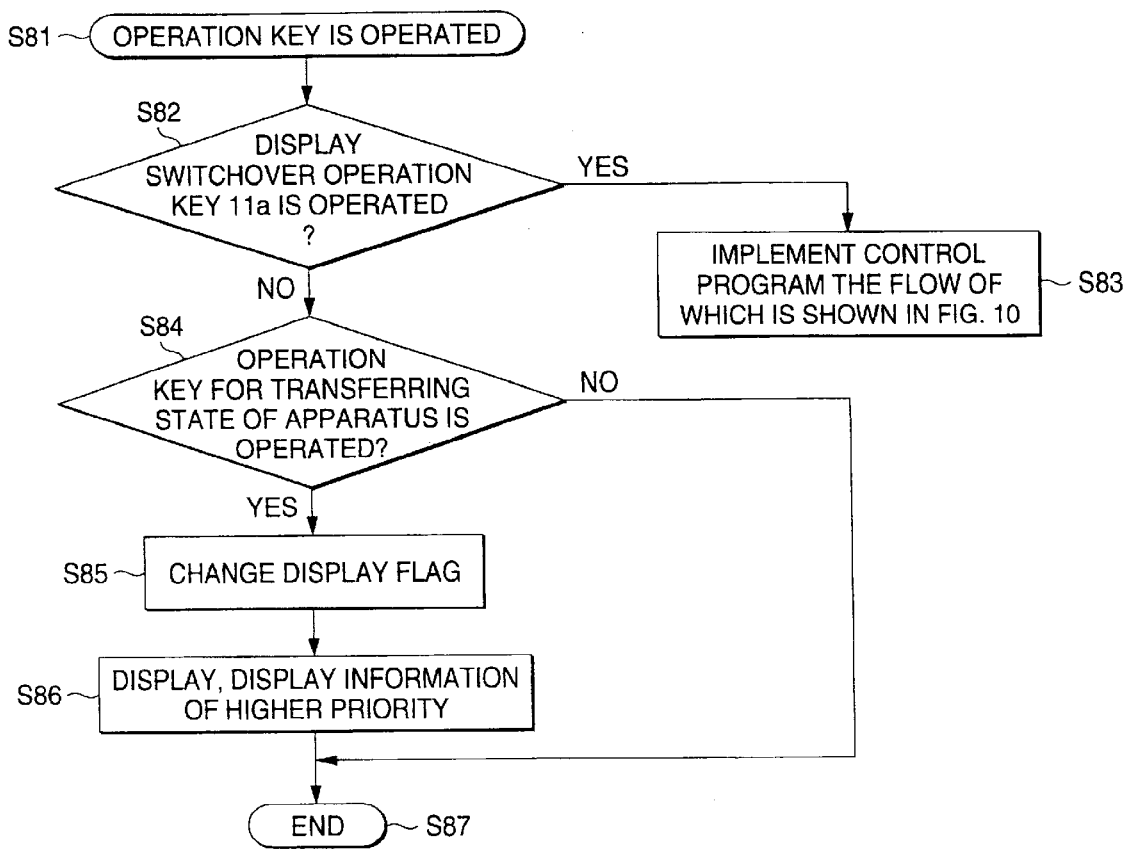
FIG. 8 is a flowchart of the display device in the case where an operation key of the audio system apparatus of the embodiment of the present invention is operated.

Each time when a command signal is supplied from the operation key, the controlling section 8 implements a control program the flow of which is shown in FIG. 8 (step S81).

Figure 10:
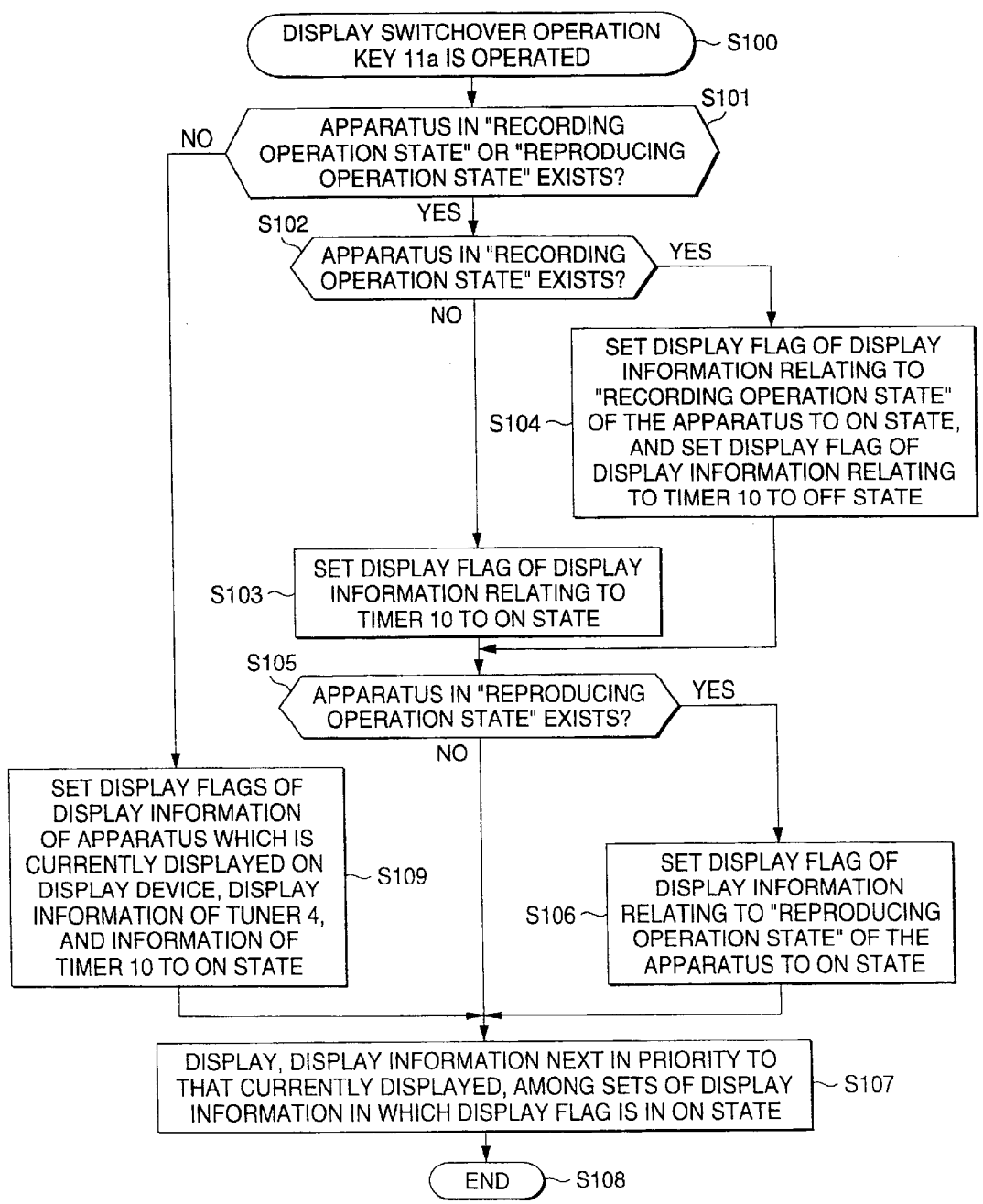
FIG. 10 is a flowchart of the display device in the case where the display switchover operation key of the audio system apparatus of the embodiment of the present invention is operated.

First, the controlling section 8 judges whether the command signal supplied from the operation key relates to the display switchover operation key 11a or not (step S82). If it is judged that the supplied command signal relates to the display switch over operation key 11a, the controlling section 8 implements a control program the flow of which is shown in FIG. 10 (step S83). This will be described later.

If it is judged that the supplied command signal does not relate to the display switchover operation key 11a, the controlling section 8 judges whether the signal relates to state transfer of an apparatus or not (step S84).

In the specification, state transfer of an apparatus means that the state of the apparatus in the information table (FIG. 6) is changed, and, for example, that the MD deck 2 is changed from "power-on state" to "recording operation state."

If it is judged that the command signal supplied from the operation key does not relate to state transfer of an apparatus, the controlling section 8 does not implement a control relating to the display, and ends this flow (step S87). Thereafter, the section performs a control according to the command signal supplied from the operation key.

If it is judged that the command signal supplied from the operation key relates to state transfer of an apparatus, the controlling section 8 changes the state of the display flag of the information table of FIG. 6 (step S85). For example, it is assumed that a command signal of instructing the recording operation of the MD deck 2 is supplied to the controlling section 8, or namely a command signal of changing the MD deck 2 from "power-on state" to "recording operation state" is supplied to the controlling section. In this case, the controlling section 8 changes the display flag of display information [5] relating to "power-on state" of the MD deck 2 in the information table (FIG. 6), from the on state to the off state, and sets the display flags of display information [1] and [2] relating to "recording operation state", to the on state.

FIG. 9 shows transfer of a part of the information table and relating to the MD deck 2 in this case.

Next, the controlling section 8 causes sets of display information in which the display flag is in the on state, to be displayed on the display section 12 in accordance with priorities. Specifically, the controlling section 8 causes in principle the display information having the highest display priority among sets of display information in which the display flag is in the on state, to be displayed. When the display information has been already displayed, the controlling section causes display information having the next priority to be displayed (the above processes are performed in step S86). Thereafter, the controlling section 8 ends this flow (step S87).

Actually, the controlling section 8 controls also operations corresponding to the command signal supplied from the operation key (for example, an operation of starting the recording on the MD deck 2). Such operations are not directly related to the present invention, and hence their detailed description is omitted.

A2-3. Display Switchover in the Case Where the Display Switchover Operation Key is Operated If, in the control program the flow of which is shown in FIG. 8, it is judged that a command signal is supplied from the display switchover operation key 11a (step S83), the controlling section 8 implements the control program the flow of which is shown in FIG. 10 (step S100).

First, the controlling section 8 judges whether, in the audio system apparatus 50, there is an apparatus which is in "recording operation state" or "reproducing operation state" or not (step S101). Specifically, this judgment is performed by checking the states of the display flags of the information table (FIG. 6).

If it is judged that there is no apparatus which is in such a state, or it is judged that there are only apparatuses which are in "power-on state," the controlling section 8 sets the display flags of display information which is currently displayed on the display section 12, display information [12] of the tuner 4, and display information [13] and [14] of the timer 10, to the on state (step S109).

In this case, the display information of an apparatus which is currently displayed on the display section 12 is one of display information [5], [8], [11], [12], [13], and [14] in the information table (FIG. 6).

In the case where display information [5] is displayed on the display section 12, for example, the controlling section 8 sets the display flags of display information [12], [13], and [14], in addition to display information [5], to the on state. FIG. 11 shows the states of the display flags in the information table (FIG. 6) in this case.

The controlling section 8 causes the display information that is next in priority to that which is currently displayed on the display section 12, among sets of display information in which the display flag is in the on state, to be displayed on the display section 12 (step S107), and then ends this flow (step S108).

For example, it is assumed that the display switchover operation key 11a is repeatedly operated while the state of the information table shown in FIG. 11 is maintained. In this case, in accordance with the display priorities in the display information shown in FIG. 11, the controlling section 8 controls the display section 12 so as to perform a cyclic display in the priority order of display information [5]→[12]→[13]→[14].

If it is judged that, in the audio system apparatus 50, there is an apparatus which is in "recording operation state" or "reproducing operation state", the controlling section 8 then judges whether, among the apparatuses, there is an apparatus which is in "recording operation state" or not (step S102). Specifically, the controlling section 8 performs this judgment by checking the states of the display flags relating to "recording operation state" of the MD deck 2 and the Tape deck 3 in the information table (FIG. 6).

If it is judged that there is an apparatus which is in "recording operation state," the controlling section 8 sets the display flag of the display information relating to "recording operation state" of the apparatus, to the on state, and sets the display flag of the display information relating to the timer 10 to the off state (the above processes are performed in step S104). When it is detected that the MD deck 2 is in "recording operation state," for example, the controlling section 8 sets the display flags of display information [1] and [2] to the on state, 11 and those of display information [13] and [14] relating to the timer 10 to the off state.

By contrast, if it is judged that there is no apparatus which is in "recording operation state," the controlling section 8 sets the display flags of display information [13] and [14] relating to the timer 10 in the information table (FIG. 6), to the on state (step S103).

Next, the controlling section 8 judges whether there is an apparatus which is in "reproducing operation state" or not (step S105). Specifically, this judgment is performed by checking the states of the display flags relating to "reproducing operation state" of the apparatuses in the information table (FIG. 6).

If an apparatus which is in "reproducing operation state" is detected, the controlling section 8 sets the display flag of the display information relating to "reproducing operation state" of the apparatus in the information table (FIG. 6), to the on state (step S106). In the case where it is detected that the CD player 1 is in "reproducing operation state," for example, the controlling section 8 sets the display flags of display information [9] and [10] to the on state.

FIG. 12 shows the information table in the case where the controlling section 8 judges that the MD deck 2 is in "recording operation state" and the CD player 1 is in "reproducing operation state."

The controlling section 8 causes the display information that is next in priority to that which is currently displayed on the display section 12, among sets of display information in which the display flag is in the on state, to be displayed on the display section 12 (step S107), and then ends this flow (step S108).

For example, it is assumed that the display switchover operation key 11a is repeatedly operated while the state of the information table shown in FIG. 12 is maintained. In this case, in accordance with the display priorities in the display information shown in FIG. 12, the controlling section 8 controls the display section 12 so as to perform a cyclic display in the priority order of display information [1]→[2]→[9]→[10].

A3. Effects of the Embodiment

As seen from the above description, the embodiment can attain the following effects.

When the power source switch (not shown) of the audio system apparatus 50 is set to the on state or the operation keys on the operating section 11 are operated, the controlling section 8 determines the states of the display flags as candidates of the display information to be displayed on the display section 12, in accordance with control programs for display switching which are prepared for each case. Therefore, it is possible to provide an audio system apparatus in which display information corresponding to the condition of the audio system apparatus 50 is always displayed on the display section 12, and which the user can conveniently use.

When the display switchover operation key 11a is operated, particularly, the controlling section 8 judges the state of each of the apparatuses in the audio system apparatus 50 as either of "recording operation state," "reproducing operation state," and "state which is not a recording state nor a reproducing state, and in which only a power supply is performed (power-on state)," and then determines the contents to be displayed on the display section 12.

As display information which is caused by the controlling section 8 to be displayed on the display section 12, plural sets of display information (the information table shown in FIG. 6) corresponding to states of the apparatuses in the audio system apparatus 50 are prepared in advance. Furthermore, the display priority order is previously determined with respect to the plural sets of display information. Therefore, display information which is necessary for the user of the audio system apparatus 50 can be rapidly displayed.

In order to attain the effects, it is not required to dispose a large number of display switchover operation keys corresponding to the apparatuses of the audio system apparatus 50. Moreover, the problems in that the display section 12 is increased in size, and that the resolution of display information of the display section 12 is reduced are not produced.

The above-mentioned embodiment is intended to clearly illustrate the contents of the present invention, and is not to be construed to restrict the contents of the present invention. Modifications may be made without departing from the spirit and the scope of the present invention. For example, the following modifications may be possible.

Modification 1

The display section 12 may be arbitrarily modified.

Figure 13:
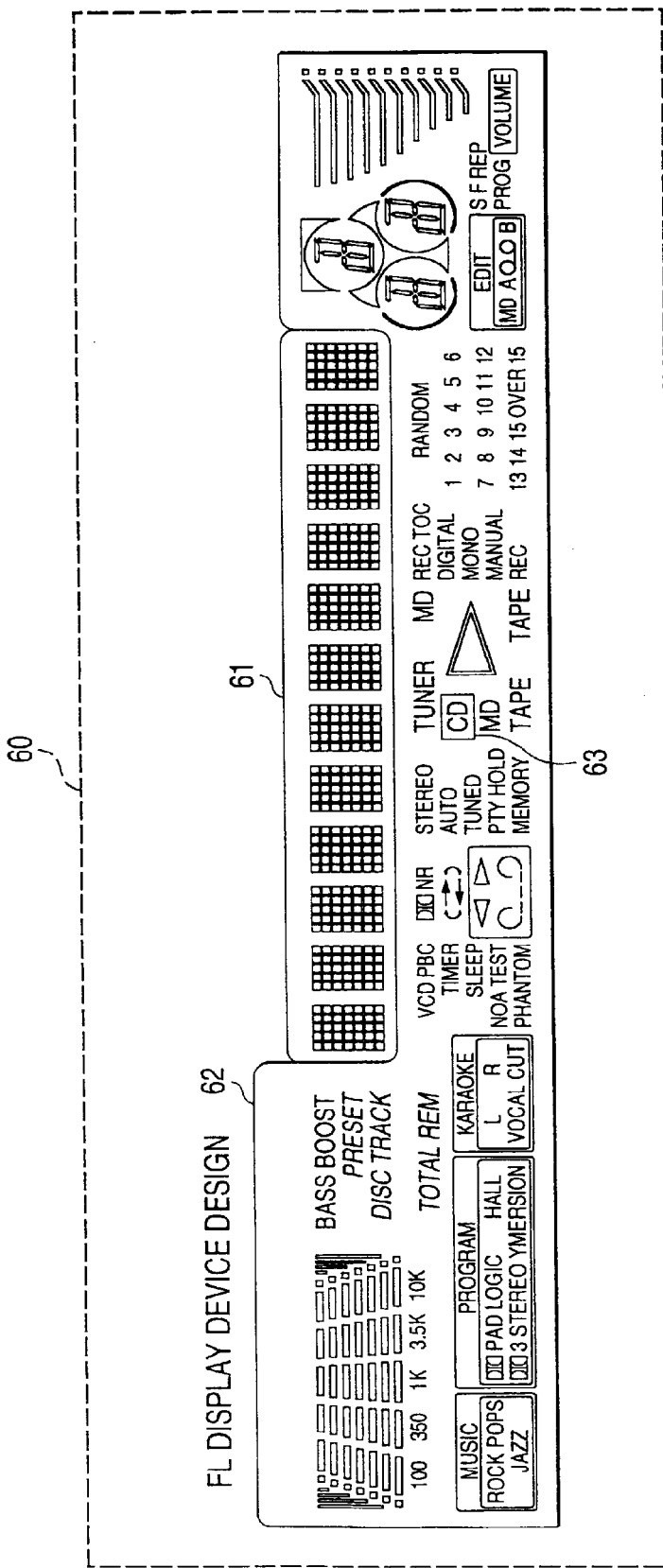
FIG. 13 is a view showing a modification of the display device of the audio system apparatus of the embodiment of the present invention.

For example, FIG. 13 shows a display device 60 illustrating the display section 12 of the embodiment more practically. The contents to be displayed on a common display section 61 of the display device 60 correspond to the display information of the display section 12 of the embodiment. In the portion (character display section 62) other than the common display section 61, characters which are previously associated with the display information of the common display section 61 are displayed.

When a CD player is in "reproducing operation state," for example, characters "CD" 63 in the character display section 62 blink to indicate that the CD player is in "reproducing operation state."

The modification can attain the same effects as those of the embodiment described above, except that a region for disposing the character display section 62 is required.

Modification 2

Other apparatuses may be added to the audio system apparatus 50 of the embodiment described, above. For example, a CD-R (Compact Disc Recordable) device and a DVD-RAM (Digital Video Disc-Random Access Memory) device may be added. In this case, both the devices are in any one of "recording operation state," "reproducing operation state," and "power-on state" in the embodiment described above. When display information and display priorities for the states are previously assigned, therefore, the present invention can be applied to such a construction.

Even when other apparatuses are added as described above, the application of the present invention eliminates the necessity of additionally disposing display switch over operation keys, and prevents the size of the display device from being increased.

Modification 3

The contents of the information table (FIG. 6) of the audio system apparatus of the embodiment may be arbitrarily changed. The apparatus states and display information in the information table (FIG. 6) should be deemed as examples, and addition or deletion of apparatus states and display information may be performed.

When the reproduction time period of the CD player is to be displayed, for example, the reproduction time period may be expressed by "reproduction time period from the top of the disc," "remaining reproduction time," or the like, in place of "reproduction time period from the top of the track." In the case where there are plural sets of display information as the form of displaying a time as described above, also the sets of display information may be added to the information table. Also in this case, when display priorities are previously assigned, the present invention can be applied as it is to such a construction.

Alternatively, "time display switchover operation key" may be disposed in addition to the display switchover operation key 11a so that, when this operation key is operated, only the form of the time display on the display section 12 is switched over.

Modification 4

With respect to the state of the tuner 4 in the embodiment, only "power-on state" in which the power is supplied has been considered. This state may be handled at the same time as "reproducing operation state." This is based on the phenomenon that, when the power is supplied, the tuner 4 receives a radio wave of a preset frequency irrespective whether the frequency is tuned or not.

FIG. 14 shows an information table in the modification, and FIG. 15 shows the contents of the information table in the case where the MD deck 2 is in "recording operation state" and the CD player 1 is in "reproducing operation state."

Under this condition, each time when the display switchover operation key 11a is operated, the display contents of the display section 12 are cyclically switched over in the priority order of display information [1]→[2]→[9]→[10]→[12].

Modification 5

The switch over control of the display flags in the information table may be arbitrarily changed. For example, the timing of switching over a display flag may be set at that when an operation key for transferring the state of the corresponding apparatus is operated.

Figure 16:
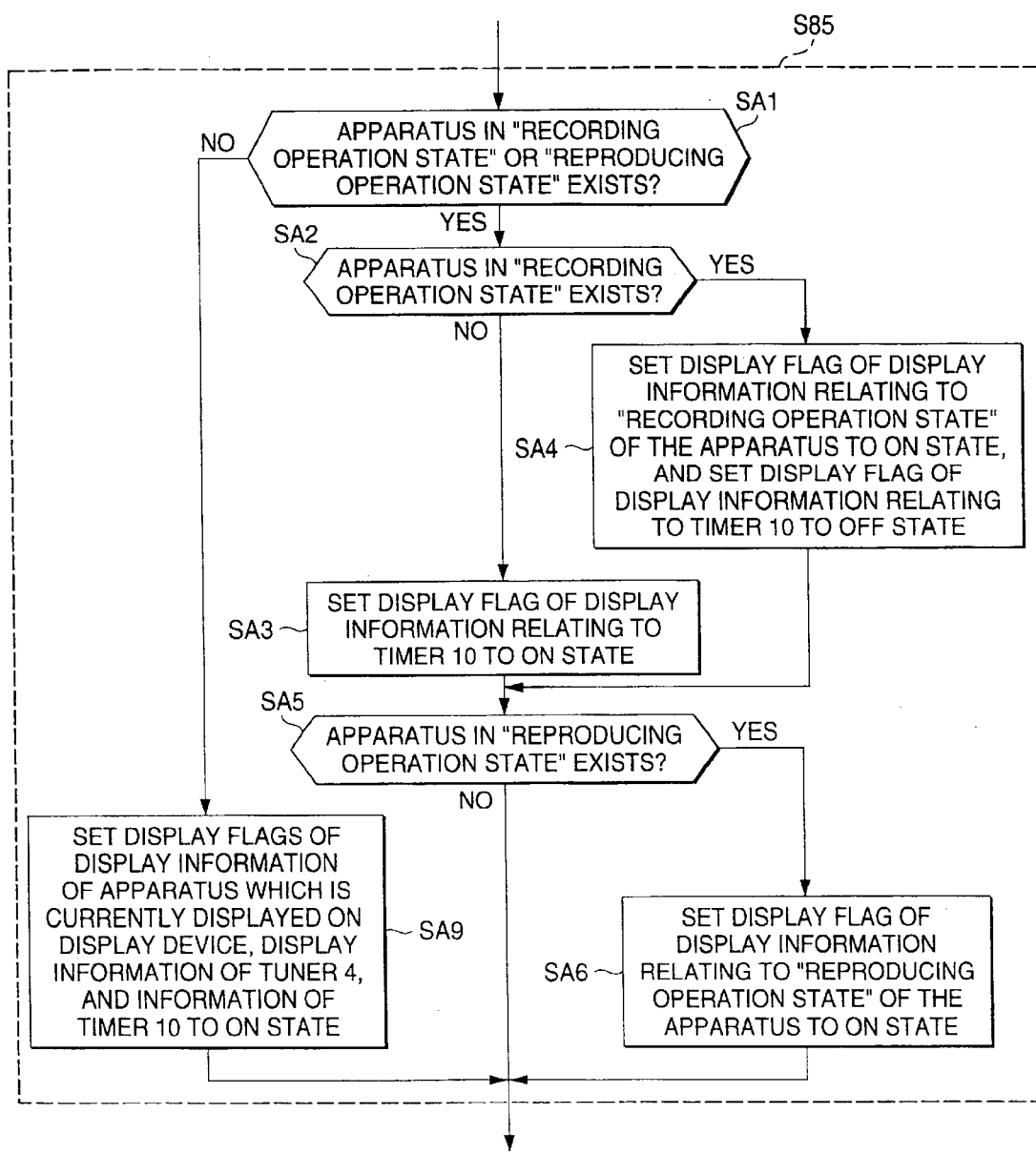
FIG. 16 is a flowchart illustrating the operation of an audio system apparatus of the modification of the embodiment of the present invention.

In the modification, when any one of the operation keys is operated, the controlling section 8 implements the control program the flow of which is shown in FIG. 8. When an operation key for transferring the state of the corresponding apparatus is operated (step S84: YES), the controlling section 8 switches over the display flags. The control of switching over the display flags is performed in accordance with a control program the flow of which is shown in FIG. 16. This control is identical with the above-described control of switching over the display flags (FIG. 10), and therefore its description is omitted.

Figure 17:
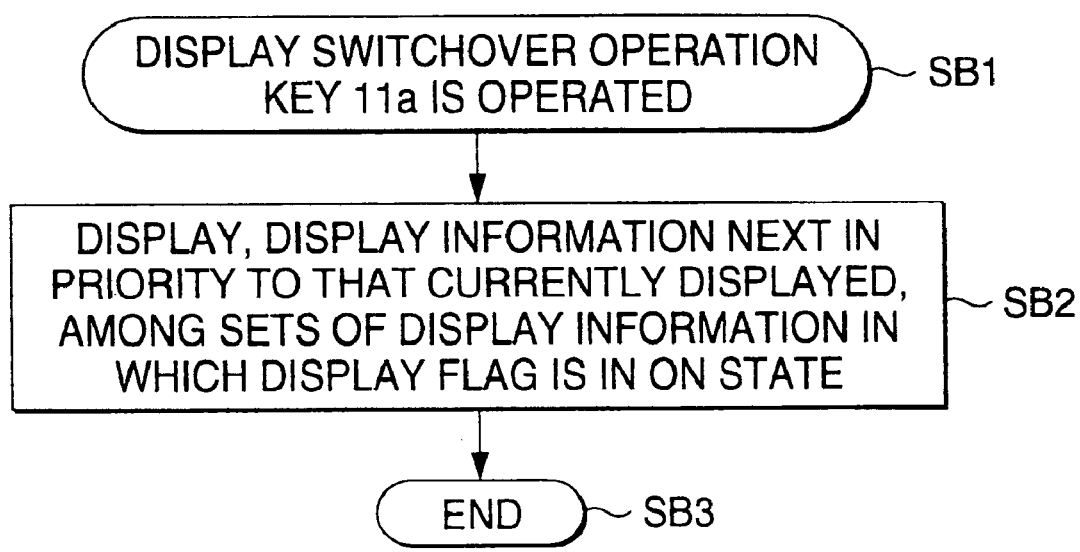
FIG. 17 is a flowchart illustrating the operation of the audio system apparatus of the modification of the embodiment of the present invention.

In the modification, the controlling section 8 switches over the display flags when an operation key for transferring the state of the corresponding apparatus is operated, and hence it is not required to switch over the display flags when the display switchover operation key 11a is operated (FIG. 17).

When the display switch over operation key 11a is operated (step SB1 in FIG. 17), therefore, the controlling section 8 is requested only to judge the states of the display flags of the apparatuses and the display priorities at this timing. Therefore, the display contents of the display section 12 can be switched over more rapidly (step SB2).

Modification 6

In the embodiment described above, information indicating the states of the display flags is added to the information table (FIG. 6). Alternatively, the display flags may not be used, and the display information may be switched over after the operations of the apparatuses are directly detected in a hardware manner.

As described above, according to the present invention, sets of display information respectively corresponding to operation states of plural apparatuses in an audio system apparatus, and priorities of the sets of display information are previously determined. In the case such as that where a display switch over operation key is operated, the states of the plural apparatuses in the audio system apparatus are detected, and display information corresponding to the states of the plural apparatuses are then displayed in the order of descending priorities. Therefore, it is possible to provide an audio system apparatus in which contents of operations of the plural apparatuses can be efficiently displayed, and which can be conveniently used by the user.

Although the effects are attained, the size of a display device is not increased, and the resolution of display information is not lowered.

What is claimed is:

1. An audio system apparatus, comprising:
   at least one audio apparatus which is able to be put in plural operation states;
   a display device on which at least one of a plurality of display information is displayed, wherein the plurality of display information respectively correspond to the plural operation states of the at least one audio apparatus;
   a display switchover operation key which is operative to switchover a display content of the display device;
   a display-priority information-storing device which stores display priority information indicating a priority order in which the plurality of display information are sequentially displayed on the display device;
   an operation detecting device which detects the plural operation states of the at least one audio apparatus; and
   a display control device which, in a case where there are a plurality of display information corresponding to at least one operation state detected by the operation detecting device, causes the display device to display information of the next priority order per each time that the display switchover operation key is operated, in accordance with the display priority information stored in the display-priority information-storing device,
   wherein, in the display priority information, display information for the at least one audio apparatus in a recording operation state is set to be higher in priority than the other display information.

2. The audio system apparatus of claim 1, wherein the plural operation states of the at least one audio apparatus include the recording operation state, a reproducing operation state, and a state which is neither the recording operation state nor the reproducing operation state.

3. The audio system apparatus of claim 1, wherein when the display switchover operation key is operated, the display control device judges a current operation state of the at least one audio apparatus, and then determines the display content to be displayed on the display device.

4. The audio system apparatus of claim 1, wherein the priority order of the display priority information is previously determined.

* * * * *